US009819619B2

(12) United States Patent
Shan et al.

(10) Patent No.: US 9,819,619 B2
(45) Date of Patent: Nov. 14, 2017

(54) METHOD, SYSTEM AND TERMINAL FOR DELETING A SENT MESSAGE IN INSTANT MESSAGE COMMUNICATION

(71) Applicant: Tencent Technology (Shenzhen) Co., Ltd., Shenzhen, Guangdong (CN)

(72) Inventors: Yi Shan, Guangdong (CN); Zhuo Tang, Guangdong (CN); Jun Wang, Guangdong (CN); Zhiyuan Lin, Guangdong (CN); Zhenan Guan, Guangdong (CN); Yuxuan Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 352 days.

(21) Appl. No.: 14/614,969

(22) Filed: Feb. 5, 2015

(65) Prior Publication Data
US 2015/0236990 A1 Aug. 20, 2015

Related U.S. Application Data

(63) Continuation of application No. PCT/CN2014/078438, filed on May 26, 2014.

(30) Foreign Application Priority Data

Sep. 30, 2013 (CN) .................. 2013 1 04656458

(51) Int. Cl.
*G06F 15/16* (2006.01)
*H04L 12/58* (2006.01)

(52) U.S. Cl.
CPC ................. *H04L 51/046* (2013.01)

(58) Field of Classification Search
CPC ........................................ H04L 51/046
(Continued)

(56) References Cited

U.S. PATENT DOCUMENTS 6,487,586 B2 * 11/2002 Ogilvie ............... G06Q 10/107
709/201
7,752,271 B2 7/2010 Quinn et al.
(Continued)

FOREIGN PATENT DOCUMENTS

CN 1988511 A 6/2007
CN 101193334 A 6/2008

OTHER PUBLICATIONS

International Search Report received in PCT Application No. PCT/CN2014/078438 dated Aug. 20, 2014.

*Primary Examiner* — Michael Y Won
(74) *Attorney, Agent, or Firm* — Brinks Gilson & Lione

(57) ABSTRACT

A method, system and terminal for deleting a sent instant message in messaging communication have been disclosed. The method including: receiving from a first communication terminal, a delete request to delete a sent instant message which has been transmitted from the first communication terminal to a second communication terminal, wherein the delete request comprises an identification which identifies the sent instant message which is to be deleted; determining whether the sent instant message which is to be deleted has already been successfully forwarded to the second communication terminal; and if it is determined that the sent instant message which is to be deleted has already been successfully forwarded to the second communication terminal, forwarding the delete request to the second communication terminal to facilitate deletion of the sent instant message by the second communication terminal.

19 Claims, 7 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,103,733 B2* | 1/2012 | Quinn | ................... | H04L 12/581 709/206 |
| 9,397,968 B2* | 7/2016 | Wang | ................ | H04L 29/06027 |
| 2004/0148356 A1* | 7/2004 | Bishop, Jr. | ................ | H04L 51/38 709/206 |
| 2005/0223073 A1* | 10/2005 | Malik | ................. | H04L 12/5855 709/206 |
| 2005/0267942 A1* | 12/2005 | Quinn | ..................... | H04L 51/04 709/206 |
| 2005/0278413 A1* | 12/2005 | Tannenbaum | ....... | G06Q 10/107 709/202 |
| 2006/0075039 A1* | 4/2006 | Narayanaswami | .. | G06Q 10/107 709/206 |
| 2007/0070988 A1* | 3/2007 | Mu | ....................... | G06Q 10/107 370/352 |
| 2007/0078935 A1* | 4/2007 | Garcia-Martin | ........ | H04L 51/04 709/206 |
| 2007/0203995 A1* | 8/2007 | Wang | ................ | H04L 29/06027 709/206 |
| 2008/0201438 A1* | 8/2008 | Mandre | ................. | H04L 12/581 709/206 |
| 2008/0263157 A1* | 10/2008 | Bhogal | ................ | G06Q 10/107 709/206 |
| 2009/0216836 A1* | 8/2009 | Haynes | ................ | G06Q 10/107 709/204 |
| 2009/0248751 A1* | 10/2009 | Myman | ................... | H04L 51/04 |
| 2010/0036916 A1* | 2/2010 | Finkelstein | ............. | G06F 15/16 709/206 |
| 2010/0235458 A1* | 9/2010 | Quinn | ................... | H04L 12/581 709/206 |
| 2011/0055334 A1* | 3/2011 | Tivyan | ................ | H04L 12/5875 709/206 |
| 2013/0041959 A1* | 2/2013 | Bengtsson | .......... | H04L 67/1095 709/206 |
| 2013/0117392 A1* | 5/2013 | Aceves | ................ | G06Q 10/107 709/206 |
| 2014/0258426 A1* | 9/2014 | Lee | ......... | H04L 51/04 709/206 |
| 2015/0326510 A1* | 11/2015 | Tomlinson | .............. | H04L 51/34 709/206 |
| 2015/0365360 A1* | 12/2015 | Yuan | ..................... | H04M 19/04 709/206 |
| 2016/0277329 A1* | 9/2016 | Gordon | ................... | H04W 4/12 |
| 2017/0011383 A1* | 1/2017 | Melzer | ................... | G06Q 10/10 |

* cited by examiner

METHOD, SYSTEM AND TERMINAL FOR DELETING A SENT MESSAGE IN INSTANT MESSAGE COMMUNICATION

CROSS-REFERENCE TO RELATED APPLICATIONS

The application is a continuation of PCT Application No. PCT/CN2014/078438, filed on May 26, 2014, which claims priority to Chinese Patent Application No. 2013104656458, filed on Sep. 30, 2013, which is incorporated by reference in their entireties.

FIELD OF THE TECHNOLOGY

The disclosure belongs to the field of Internet technology; in particular, to a method, system and apparatus for deleting an instant message already sent out from a communication terminal.

BACKGROUND

Internet technology enables social and chatting applications to possess increasing function capabilities. For example, a user may log in to his or her instant messaging account on a smart phone, a communication tablet, a personal computer (PC) or a laptop computer to send or receive instant chat messages. Usually, such instant messages are stored at both a transmitting end and a receiving end, respectively. How, if the user would not like to store a certain sent instant message at the receiving end which the sent instant message may be one of a sensitive, secret or privacy nature, or may be by mistake the user at the transmission end sends a message unintended for the recipient, the user would want to have the sent instant message at the receiving end to delete it.

With the current technology, it is known that once an instant message has been sent from the transmission end, the send instant message cannot be deleted by the transmission end unilaterally. Instead, the user from the transmission end would need to negotiate with the user at the receiving end in order to get cooperation to delete the instant message. Assuming there is a success negotiation, the user at the receiving end would need to trigger the deletion operation execution. Otherwise, the deletion operation cannot take place.

At the time of implementation, the requirements of a successful negotiation between the transmission end and the receiving end, and the receiving end having to trigger the deletion operation do not render the transmission end control to of the deletion operation, thus cannot satisfy the real need of the user at the transmission end.

SUMMARY

An embodiment of the present disclosure has provided a method for deleting a sent instant message in messaging communication have been disclosed. The method including: receiving from a first communication terminal, a delete request to delete a sent instant message which has been transmitted from the first communication terminal to a second communication terminal, wherein the delete request comprises an identification which identifies the sent instant message which is to be deleted; determining whether the sent instant message which is to be deleted has already been successfully forwarded to the second communication terminal; and if it is determined that the sent instant message which is to be deleted has already been successfully forwarded to the second communication terminal, forwarding the delete request to the second communication terminal to facilitate deletion of the sent instant message by the second communication terminal.

Another embodiment of the disclosure discloses a method of deleting a sent message in messaging communication, the method including a first terminal, performing: obtaining a delete request to delete a sent instant message which has been transmitted to a second communication terminal, wherein the delete request comprises an identification which identifies the sent instant message which is to be deleted; sending to a server the delete request, such that the server forwards the delete request to the second communication terminal in order to facilitate deletion of the sent instant message according to the delete request.

Another embodiment of the disclosure discloses a method of deleting a sent message in messaging communication, the method including a second terminal, performing: receiving a delete request forwarded by a server, wherein the delete request is sent from a first communication terminal to the server, and the delete request is for deleting a sent instant message which has been transmitted by the first communication terminal to the second communication terminal, wherein the delete request comprises an identification which identifies the sent instant message which is to be deleted; determining according to the identification which identifies the sent instant message, whether the sent instant message which is to be deleted is still stored by the second communication terminal; and if so, deleting by the second communication terminal, the identified stored sent instant message according to the delete request.

Another embodiment of the disclosure discloses a server for facilitating deletion of a sent instant message in messaging communication, the server includes at least a processor operating in conjunction with at least a memory which stores instruction codes operable as plurality of modules, wherein the plurality of modules include: a first receiving module, which receives from a first communication terminal, a delete request to delete a sent instant message which has been transmitted from the first communication terminal to a second communication terminal, wherein the delete request comprises an identification which identifies the sent instant message which is to be deleted; a judging module, which determines whether the sent instant message which is to be deleted has already been successfully forwarded to the second communication terminal; and a first forwarding module, which if it is determined that the sent instant message which is to be deleted has already been successfully forwarded to the second communication terminal, forwards the delete request to the second communication terminal to facilitate deletion of the sent instant message by the second communication terminal.

Another embodiment of the disclosure discloses a communication terminal for facilitating deletion of a sent instant message in messaging communication, the communication terminal comprises at least a processor operating in conjunction with at least a memory which stores instruction codes operable as plurality of modules, wherein the plurality of modules include: an obtaining module, which obtains a delete request to delete a sent instant message which has been transmitted to a second communication terminal, wherein the delete request comprises an identification which identifies the sent instant message which is to be deleted; and a transmission module, which transmits to a server the delete request, such that the server forwards the delete request to the second communication terminal in order to facilitate deletion of the sent instant message according to the delete request.

In the embodiments of the disclosure, a delete request being transmitted to a server by a first communication terminal, wherein the server may determine whether the sent message to be deleted has already been forwarded to the second communication terminal according to the delete request. If it is determined that the instant message to be deleted has already been forwarded to the second communication terminal, the delete request will be forwarded to and be carried out by the second communication terminal. Since the process does not require negotiation with a trigger operation by the user of the second terminal, the operation is simplified and controllable by the user of the first communication terminal. Besides, because the deletion method is applicable to any recipient communication terminal, it enjoys good flexibility.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure is illustrated in further details with the accompanied drawings and embodiments. It should be understood that the embodiments described herein are merely examples to illustrate the present disclosure, not to limit the present disclosure.

Figure 1:
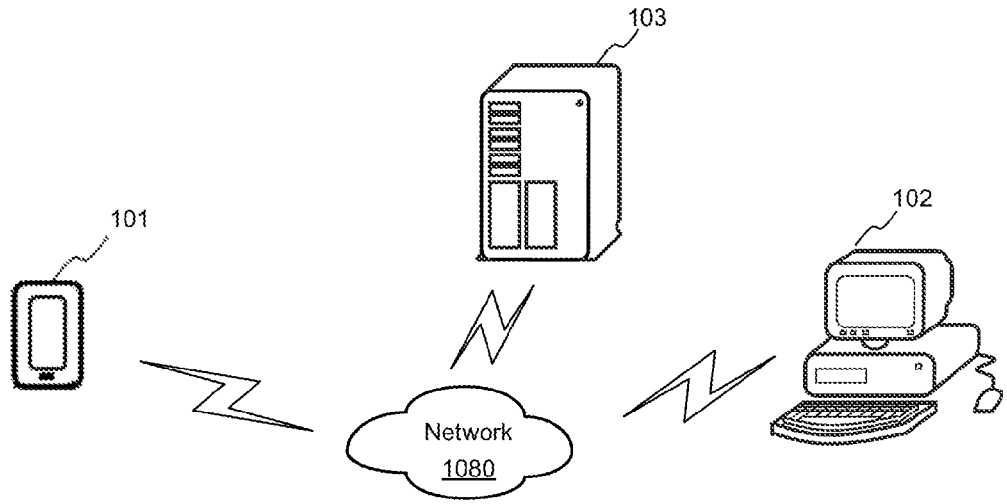
FIG. 1 is an exemplary system environment in implementing a method for deleting a sent instant message, according to an embodiment of the disclosure.

FIG. 1 is an exemplary system environment in implementing a method for deleting a sent instant message, according to an embodiment of the disclosure. Referring to FIG. 1, the system environment may include at least a network (1080) facilitating communication among a server (103), a first communication terminal (101) and a second communication terminal (102).

Figure 10:
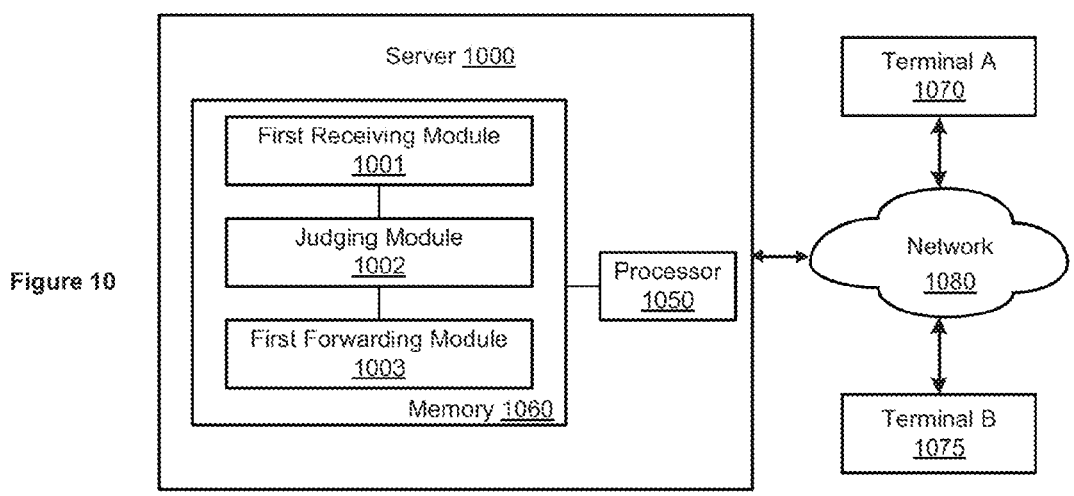
FIG. 10 is an exemplary structure diagram of a server, according to an embodiment of the disclosure.

The exemplary structure of the server (103) may be depicted as the server (1000) in FIG. 10. The exemplary structure of the first communication terminal (101) may be depicted as the terminal (1100) in FIG. 11. The exemplary structure of the second communication terminal (102) may be depicted as the terminal (1300) in FIG. 13. In an embodiment, the first communication terminal (101) and the second communication terminal (102) may be one of: a smart-phone, a tablet computing device, a laptop computer or a desk top computer, or a similar communication device, etc.

As seen in FIG. 1, instant messaging communication is carried out between the first communication terminal (101) and the second communication terminal (102) through the network (1080) which may be a wireless or wired network. The server (103) may facilitate the instant messaging communication between the first communication terminal (101) and the second communication terminal (102). The user of the first communication terminal (101) may by mistake, transmit an instant message to the second communication terminal (102), and decides to make a request to the server to delete the instant message stored in server in (103) or in the second communication terminal (102). The user of the second communication terminal (102) may do likewise, after mistakenly transmitting an instant message to the first communication terminal (101). The method may be illustrated in the following disclosed embodiments.

Figure 2:
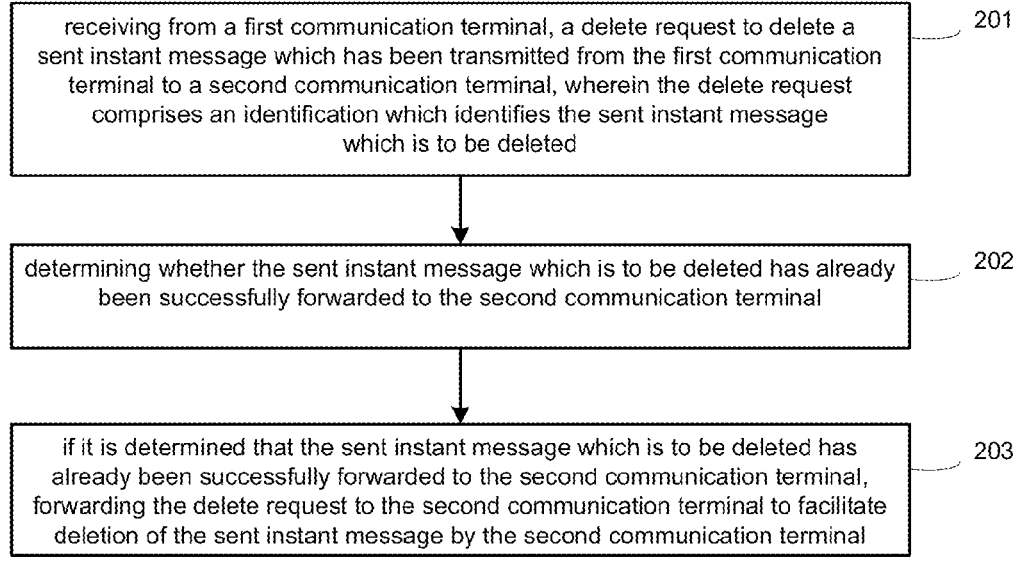
FIG. 2 is an exemplary flow diagram of a process for deleting a sent instant message, according to an embodiment of the disclosure.

FIG. 2 is an exemplary flow diagram of a process for deleting a sent instant message, according to an embodiment of the disclosure. The method may include the following exemplary steps:

Step 201: receiving from a first communication terminal, a delete request to delete a sent instant message which has been transmitted from the first communication terminal to a second communication terminal, wherein the delete request comprises an identification which identifies the sent instant message which is to be deleted.

Step 202: determining whether the sent instant message which is to be deleted has already been successfully forwarded to the second communication terminal.

Step 203: if it is determined that the sent instant message which is to be deleted has already been successfully forwarded to the second communication terminal, forwarding the delete request to the second communication terminal to facilitate deletion of the sent instant message by the second communication terminal.

Preferably, if it is determined that the sent instant message which is to be deleted has still not been successfully forwarded to the second communication terminal, cancelling further operation on forwarding the sent instant message which is to be deleted to the second communication terminal.

Preferably, after the cancelling of the transmission of the sent instant message to the second communication terminal, the method may include: transmitting a first notification message to be displayed on the second communication terminal, such that the display of the first notification message replaces the display of the deleted sent instant message.

Figure 12:
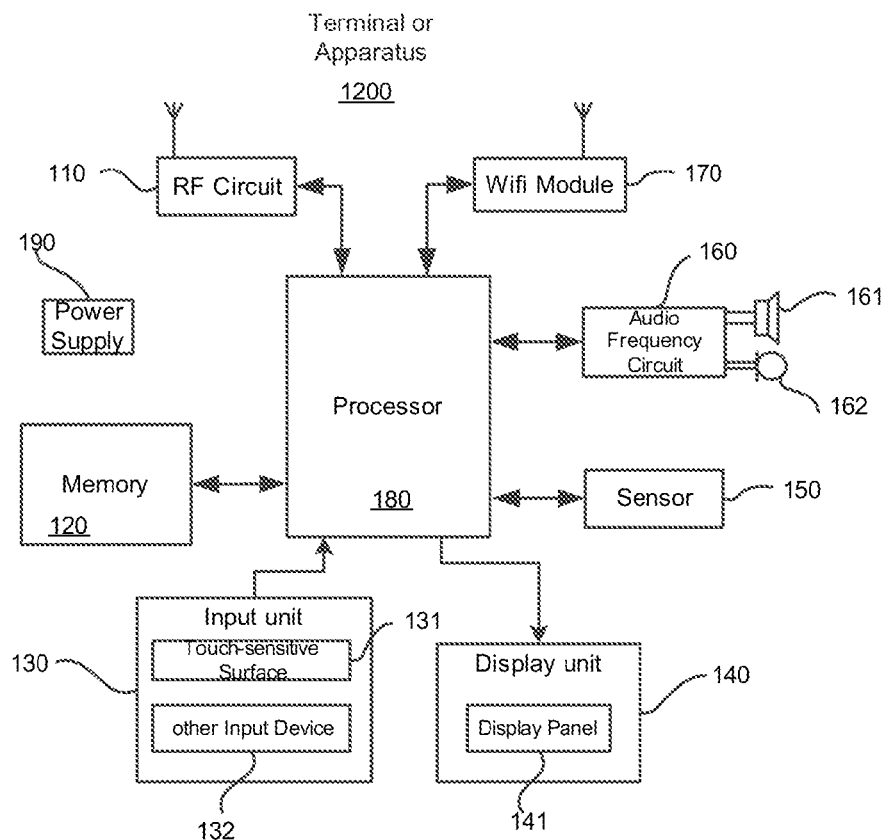
FIG. 12 is an exemplary structure diagram of a communication terminal, according to another embodiment of the disclosure.

Preferably, after receiving the delete request from the first communication terminal, the method further including: determining by the server, whether the sent instant message which is to be deleted has been locally stored (e.g., in the memory (120) in FIG. 12) in the second communication terminal according to the identification which identifies the sent instant message; and if so, deleting in the second communication terminal, the identified locally stored sent instant message which is to be deleted.

Preferably, after receiving the delete request from the first communication terminal, the method further including: receiving a second notification message sent from the second communication terminal to inform that the second communication terminal does not support facilitating the deletion of the sent instant message; and forwarding the second notification message to the first communication terminal. After the deletion of the identified stored sent instant message which is to be deleted, the method further including: returning a response to inform the first communication terminal that the deletion request has been successfully executed.

Figure 3:
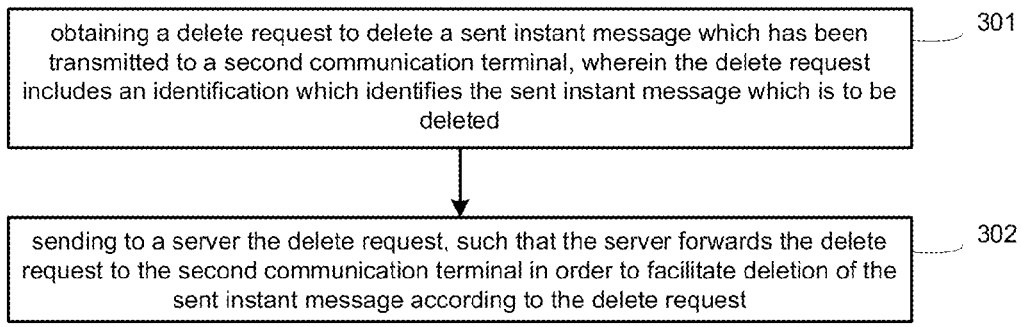
FIG. 3 is an exemplary flow diagram of a process for deleting a sent instant message, according to another embodiment of the disclosure.

FIG. 3 is an exemplary flow diagram of a process for deleting a sent instant message, according to another embodiment of the disclosure. The method may be executed by a first communication terminal, which may include the following exemplary steps:

Step 301: obtaining a delete request to delete a sent instant message which has been transmitted to a second communication terminal, wherein the delete request comprises an identification which identifies the sent instant message which is to be deleted.

Preferably, the step of obtaining the delete request may include: detecting a selection operation on the sent instant message which is to be deleted and determining whether a time of transmission for the sent instant message which is to be deleted has exceeded a preset duration; if the time of transmission for the sent instant message which is to be deleted has not exceeded the preset duration, displaying a deletion option selection for carrying out deletion of the sent instant message, and upon detecting the selection of the deletion option, obtaining the delete request which carries the identification which identifies the sent instant message which is to be deleted.

Step 302: sending to a server the delete request, such that the server forwards the delete request to the second communication terminal in order to facilitate deletion of the sent instant message according to the delete request.

Preferably, after sending to the server the delete request, the method further including: receiving and displaying a first notification message forwarded by the server, wherein the first notification message informs that the second communication terminal does not support facilitating the deletion of the sent instant message.

Preferably, after sending to the server the delete request, the method further including: receiving a response returned by the server, informing the first communication terminal that the deletion request has been successfully executed.

Figure 4:
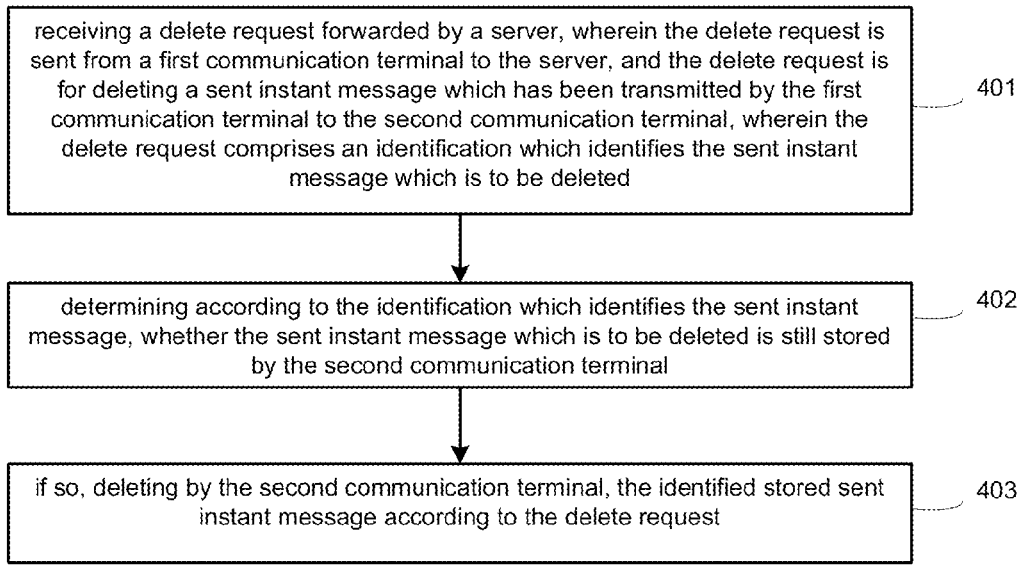
FIG. 4 is an exemplary flow diagram of a further process for deleting a sent instant message, according to another embodiment of the disclosure.

FIG. 4 is an exemplary flow diagram of a further process for deleting a sent instant message, according to another embodiment of the disclosure. The method may be executed by a first communication terminal, which may include the following exemplary steps:

Step 401: receiving a delete request forwarded by a server, wherein the delete request is sent from a first communication terminal to the server, and the delete request is for deleting a sent instant message which has been transmitted by the first communication terminal to the second communication terminal, wherein the delete request comprises an identification which identifies the sent instant message which is to be deleted.

Step 402: determining according to the identification which identifies the sent instant message, whether the sent instant message which is to be deleted is still stored by the second communication terminal.

Step 403: if so, deleting by the second communication terminal, the identified stored sent instant message according to the delete request.

Preferably, the process also includes the steps of: receiving a first notification message from the server informing of a successful deletion of the sent instant message by the server, wherein the first notification message is to be displayed on the second communication terminal, such that the display of the first notification message replaces the display of the deleted sent instant message from the first communication terminal.

Preferably, after the receiving server forwarding the delete request sent from the first communication terminal, the method further including: if the second communication terminal operation does not support facilitating deletion of the sent instant message which is to be deleted according to the delete request, sending by the second communication terminal a second notification message to the server, wherein the second notification message informing the server that the second communication terminal does not support facilitating deletion of the sent instant message, in order that the server forwards the second notification message to inform the first communication terminal.

The method or process provided in the above embodiment enables the sent instant message which has been transmitted to the server and the second communication terminal be deleted without intervention by the user of the second communication terminal.

Figure 5:
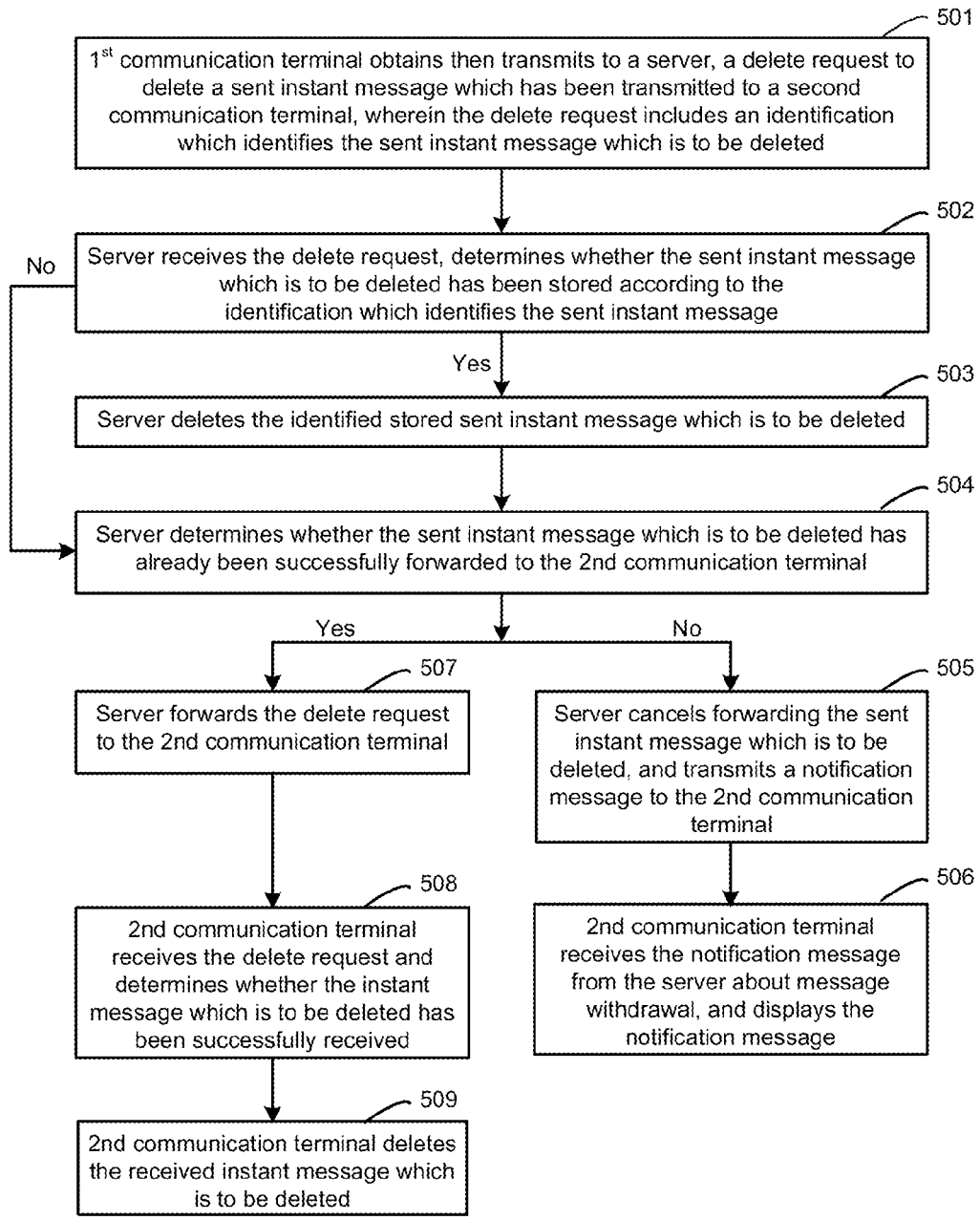
FIG. 5 is an exemplary flow diagram of a process for deleting a sent instant message, according to another embodiment of the disclosure.

FIG. 5 is an exemplary flow diagram of a process for deleting a sent instant message, according to another embodiment of the disclosure. The flow diagram may further illustrates the exemplary steps performed by the system as depicted in FIG. 1:

Step 501: the first communication terminal obtains then transmits to a server, a delete request to delete a sent instant message which has been transmitted to a second communication terminal, wherein the delete request includes an identification which identifies the sent instant message which is to be deleted.

Figure 6:
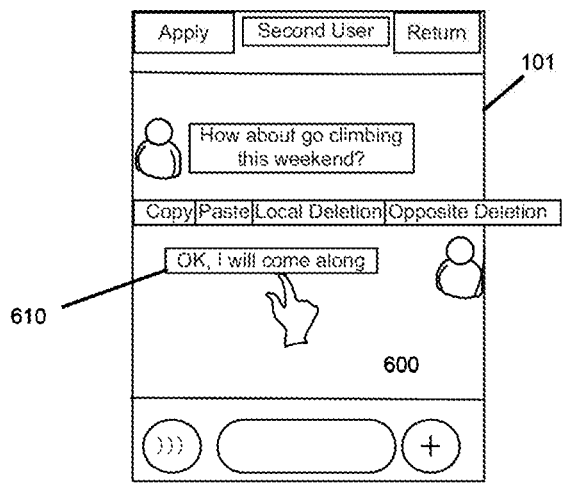
FIG. 6 is an exemplary screen shot interface diagram of a first communication terminal, according to the embodiment as depicted in FIG. 5 of the disclosure.

More specifically, the user of the first communication terminal may trigger a process to delete a sent instant message transmitted to the second communication terminal. The first communication terminal may provide an interface diagram as depicted as in FIG. 6, which may store local instant messages from a chat session. For example, the triggering may be a long-pressing pause, sliding or a clicking operation on a selected sent instant message (610) on the interface display (600). The selected sent instant message (610) will be taken as the sent instant message which is to be deleted, and a delete request may be obtained in this manner.

Preferably, to support the delete operation of a sent instant message, the process provided in the embodiment may include setting a time limit or duration for each instant message after sending, endowing each message with a time-bound delete operation. Therefore, upon detecting the long-pressing pause, sliding or clicking by the user on the selected message (610) displayed on the interface (600), the process may verify the time limit or duration of delete operation of the selected message by user, in order to timely execute the delete operation without going beyond the time-bound or duration of delete operation. Certainly, the time limit of delete operation for different messages may be either same or different. The embodiment does not limit the preset time for each message to make an evident description.

Referring to the description of the above description, the obtaining of the delete request by the first communication terminal may include the first communication terminal (101) testing the operation that the sent instant message is selected, and determining whether a time of transmission for the sent instant message which is to be deleted has exceeded a preset duration.

If the time of transmission for the sent instant message which is to be deleted has not exceeded the preset duration, displaying a deletion option selection for carrying out deletion of the sent instant message, and upon detecting the selection of the deletion option, obtaining the delete request which carries the identification which identifies the sent instant message which is to be deleted.

The instant message to be deleted may be a message of any form, including, but not limited to, text message, picture message, voice message, business card message, location message and video message, to name a few. As for the length of preset duration, it is not specifically limited in the embodiment. For example, the first communication terminal (101) may set the preset duration to be 15 minutes. If the transmission time of the sent instant message has not exceeded the preset duration, the first communication terminal (101) may display options for the user to delete the sent instant message (610). After the first communication terminal (101) has detected that an option is selected, the first communication terminal (101) may access the delete request accordingly and transmit the delete request to the server (103). The delete request may include an identification which identifies the sent instant message which is to be deleted, so that server (103) may determine which instant message is to be deleted in the delete request.

Regarding the manner the first communication terminal (101) may transmit the delete request to the server (103), it is not specifically limited in the embodiment. For example, the first communication terminal (101) may transmit a Delete request ( ) command to instruct sending the delete request.

Step 502: The server receives the delete request, determines whether the sent instant message which is to be deleted has been stored according to the identification which identifies the sent instant message.

If stored, execute step 503. The server (103) may delete the identified stored sent instant message which is to be deleted. For example, if the first instant communication terminal (101) sends a delete request by transmitting DeleteRequest ( ) instruction to the server (103), the server (103) may receive the DeleteRequest ( ) instruction and parse the instruction to access the delete request.

After receiving the delete request, the server (103) may parse the delete request and access an identification of the instant message (610). Then, the server (103) may search the instant message corresponding to the identification among the instant messages stored locally to determine if the instant message to be deleted has already been stored. If so, it may be confirmed that the instant message to be deleted has been stored, if not, there would be no such confirmation.

Step 503: The server (103) may delete the identified stored instant message which is to be deleted.

There may be various ways the server (103) may delete the stored instant message (610). For example, after the server (103) may find the instant message to be deleted and delete it in a storage area (such as memory (120), see FIG. 12) to release the memory space for storage of other instant messages.

Preferably, after the server (103) successfully deletes the instant message, the server (103) may send a response or notification message of successful deletion to the first communication terminal (101) in order to inform the first communication terminal (101) that the instant message to be deleted has been deleted successfully. The response or notification message transmitted by the server to the first communication terminal (101) upon a successful deletion may include, but not limited to, the DeleteResult (ok) message in the form of a data package.

Figure 7:
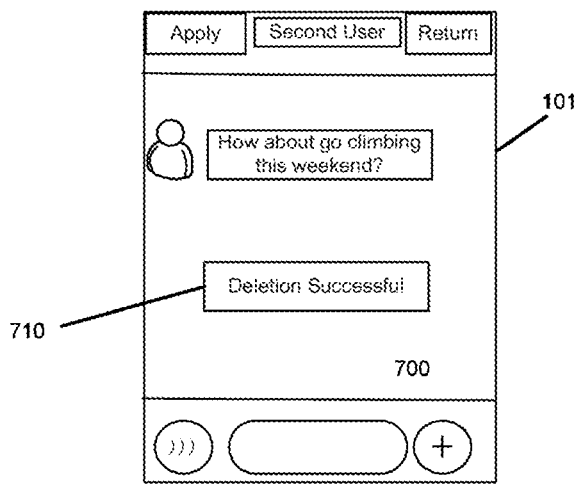
FIG. 7 is an exemplary screen shot interface diagram of a first or a second communication terminal, according to the embodiment as depicted in FIG. 5 of the disclosure.

Further, after the first communication terminal (101) has received the response or notification of successful deletion of the instant message from the server (103), the interface (700) of the first terminal may display a notification message of "deletion successful" (710) to inform the user of the first communication terminal (101) that the sent instant message to be deleted has been successfully deleted, as depicted in FIG. 7.

Step 504: The server (103) may determine whether the sent instant message which is to be deleted has already been successfully forwarded also to the second communication terminal (102). If not, execute step 505, if yes, execute step 507.

More specifically in step 504, because the server (103) facilitates forwarding the instant message (610) from the first communication terminal (101) to the second communication terminal (102), the server (103) would need to first determine whether the instant message to be deleted has been forwarded to the second communication terminal (102) after the server performs deletion on the instant message (610) so that the instant message (610) transmitted by the first communication terminal may be thoroughly deleted.

In an embodiment, regarding the manner the server (103) determines whether or not the instant message (610) to be deleted has already been forwarded to the second communication terminal (102), the server may divide a storage area (such as memory (1060) in FIG. 10) into several partitions to store forwarded or non-forwarded instant messages, respectively, to the second communication terminal (102). The server (103) may therefore determine by searching according to the delete request, the identification of the instant message in both partitions (i.e., forwarded and non-forwarded partitions) of the storage area, to determine if the instant message to be deleted has already been forwarded to the second communication terminal (102).

Specifically, as shown in Table 1 below, the server (103) may divide the storage area into a first storage area and a second storage area. The first storage area may store the un-forwarded instant messages (to the second communication terminal (102)) and the second storage area may store the already forwarded messages (to the second communication terminal (102)).

TABLE 1

| Storage area | Stored message | Stored message |
|---|---|---|
| First storage area | The first message | |
| Second storage area | | The second message |

After the server (103) receives the instant message transmitted from the first communication terminal (101), the server (103) may first store the received instant message into the first storage area. After the first instant message is forwarded to the second communication terminal (102), the instant message may be removed and stored to the second storage area. Referring to Table 1, the first instant message in Table 1 may be an instant message not yet forwarded to the second communication terminal (102), and the second instant message may be one which has already been successfully forwarded to the second communication terminal (102).

In the above step 504, if the instant message corresponding to the identification is found by the server (103) in the first storage area (i.e., the first message), the first message may not be forwarded to the second communication terminal (102) (proceed to step 505). If found by the server that the instant message corresponding to the identification is stored in the second storage area (i.e., the second message), the second message has been successfully forwarded to the second communication terminal (102) (see step 507).

Step 505: The server (103) may cancel the forwarding operation of the instant message to be deleted and may transmit a notification message (810) (see FIG. 8) to the second communication terminal (102) to inform the second communication terminal (102) that a message has been withdrawn by the first communication terminal (101).

Step 506: The second communication terminal (102) may receive the notification message (810) (as a data packet) transmitted by the server (103), and may display the notification message (810) in the position on the display of the interface (800) which replaces the deleted instant message (610) sent by the first communication terminal (101).

Figure 8:
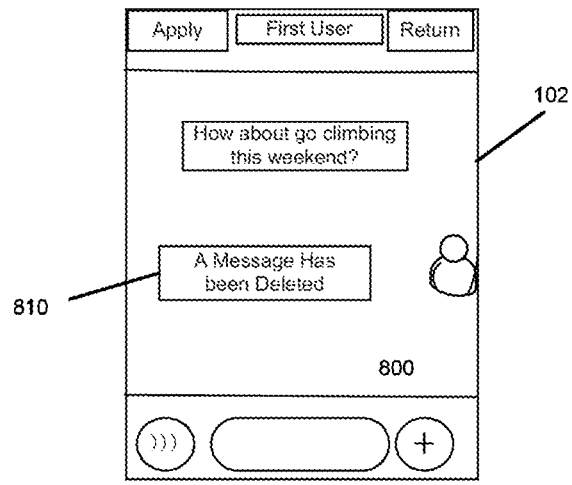
FIG. 8 is an exemplary screen shot interface diagram of a third communication terminal, according to the embodiment as depicted in FIG. 5 of the disclosure.

The manner of displaying the instant message to be deleted on the second communication terminal (102) may be illustrated by the screen shot display interface (800) diagram as depicted in FIG. 8.

As seen, the instant message (610) transmitted from the first communication terminal (101) may be deleted according to within a preset time duration and according a determination of whether the instant message to be deleted has been forwarded or not. The instant message (610) may be deleted and not forwarded by the server (103), if fulfilling the preset time duration and if found to be stored in the un-forwarded partition of the storage area. Accordingly, there would not be any need of participation from the user of the second communication terminal in the deletion process as described above. In addition, the second communication (102) would receive a notification message (810) that an instant message has been successfully deleted from being sent to the second communication terminal (102).

Step 507: The server (103) may forwards the delete request to the second communication terminal (102), under the condition that the server has determined that the instant message to be deleted has been forwarded to the second communication terminal (102). The delete request forwarded by the server may then instruct the second communication terminal (102) to delete the forwarded or sent instant message (610) instead.

Step 508: The second communication terminal may receive the delete request and determines whether the instant message which is to be deleted has been successfully received and stored in the second communication terminal (102). If so, proceed to step 509 to delete the received instant message which is to be deleted.

In the step 509, if the server (103) forwards the delete request in the form of compression, the second communication terminal (102) will likewise receive the compressed delete request and perform un-compression to get the delete request.

Figure 9:
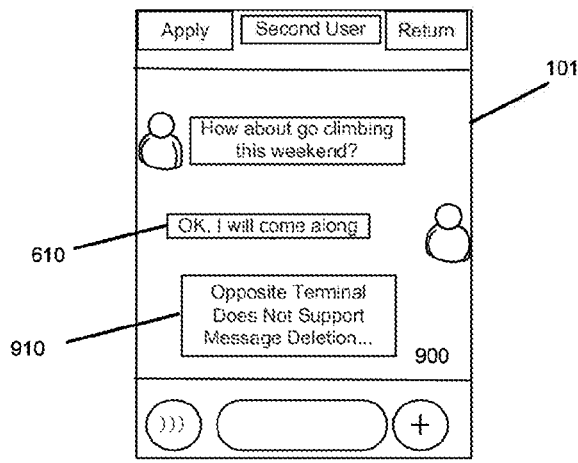
FIG. 9 is an exemplary screen shot interface diagram of a fourth communication terminal, according to the embodiment as depicted in FIG. 5 of the disclosure.

Alternately, if the second communication terminal (102) does not support the message deletion operation in response to the delete request sent by the first communication terminal (101), the second communication terminal (102) will send back to the server (103) a notification message (910) to inform the server that message deletion is not supported. Then, the server (103) will forward the notification message (910) to the first communication terminal (101) to inform the first communication terminal (101) that the second terminal (102) does not support delete request, and consequently, the sent instant message (610) may not be successfully deleted on the second communication terminal (102). Consequently, the notification message (910) that delete request is not supported may be displayed on the first communication terminal (101), as depicted by the exemplary screen shot of display interface (900) as shown in FIG. 9.

Step 509: The second communication terminal (102) may delete a locally stored (e.g., in the memory (120) in FIG. 12) instant message according the delete request.

FIG. 10 is an exemplary structure diagram of a server (1000) for facilitating deletion of a sent instant message in messaging communication, according to an embodiment of the disclosure. The server (1000) may include at least a processor (1050) operating in conjunction with at least a memory (1060) which stores instruction codes operable as plurality of modules, wherein the plurality of modules may include:

A first receiving module (1001), which receives from a first communication terminal (1100 in FIG. 11, or terminal A in FIG. 10), a delete request to delete a sent instant message which has been transmitted from the first communication terminal (1100 or terminal A) to a second communication terminal (i.e., terminal B (1075)), wherein the delete request may include an identification which identifies the sent instant message which is to be deleted.

A judging module (1002), which determines whether the sent instant message which is to be deleted has already been successfully forwarded to the second communication terminal; and a first forwarding module (1003), which if it is determined that the sent instant message which is to be deleted has already been successfully forwarded to the second communication terminal (i.e., terminal B), forwards the delete request to the second communication terminal to facilitate deletion of the sent instant message by the second communication terminal (i.e., terminal B).

Preferably, the server may further include: a cancelling module, which if it is determined that the sent instant message which is to be deleted has still not been successfully forwarded to the second communication terminal, cancels further operation on forwarding the sent instant message which is to be deleted to the second communication terminal (i.e., terminal B).

Preferably, the server (1000) may further include: a transmission module, which transmits a first notification message to be displayed on the second communication terminal, such that the display of the first notification message replaces the display of the deleted sent instant message.

Preferably, the server may also include: a determining module, which determines whether the sent instant message which is to be deleted has been stored according to the identification which identifies the sent instant message; and a deletion module, which upon determining that the sent instant message which is to be deleted has been stored according to the identification, deletes the identified stored sent instant message which is to be deleted.

Preferably, the server (1000) may further include: a second receiving module, which receives a second notification message sent from the second communication terminal to inform that the second communication terminal does not support facilitating the deletion of the sent instant message; and a second forwarding module, which forwards the second notification message to the first communication terminal.

Preferably, the server (1000) may further include: a return module, which returns a response to inform the first communication terminal that the deletion request has been successfully executed.

Figure 11:
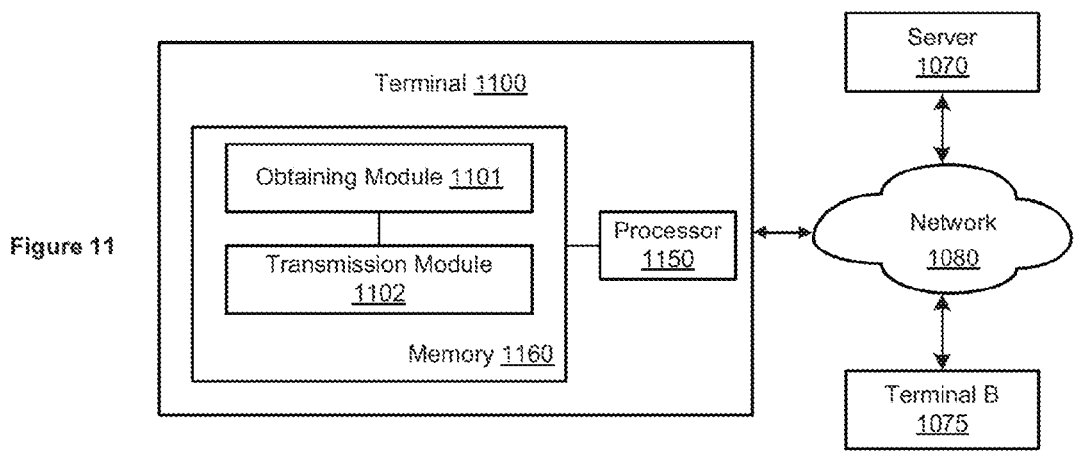
FIG. 11 is an exemplary structure diagram of a communication terminal, according to an embodiment of the disclosure.

FIG. 11 is an exemplary structure diagram of a communication terminal (1100), according to an embodiment of the disclosure. The communication terminal (1100) may include at least a processor (1150) operating in conjunction with at least a memory (1160) which stores instruction codes operable as plurality of modules, wherein the plurality of modules may include: an obtaining module (1101), which obtains a delete request to delete a sent instant message which has been transmitted to a second communication terminal, wherein the delete request comprises an identification which identifies the sent instant message which is to be deleted; and a transmission module (1102), which transmits to a server (1070) the delete request, such that the server (1070) forwards the delete request to the second communication terminal (terminal B (1075)) in order to facilitate deletion of the sent instant message according to the delete request.

Preferably, the communication terminal (1100) may further include: a detection unit, which detects a selection operation on the sent instant message which is to be deleted and determining whether a time of transmission for the sent instant message which is to be deleted has exceeded a preset duration;

a judgment unit, which determines whether a time of transmission for the sent instant message which is to be deleted has exceeded a preset duration; a display unit, which if the time of transmission for the sent instant message which is to be deleted has not exceeded the preset duration, displays a deletion option selection for carrying out deletion of the sent instant message; and an obtaining unit, which upon detecting the selection of the deletion option, obtains the delete request which carries the identification which identifies the sent instant message which is to be deleted.

Preferably, the communication terminal (1100) may further include: a first receiving module, which receives a first notification message forwarded by the server, wherein the first notification message informs that the second communication terminal does not support facilitating the deletion of the sent instant message; and a display module, which displays the first notification message forwarded by the server on the first communication terminal.

Preferably, the communication terminal (1100) may further include: a second receiving module, which receives a response returned by the server, informing the first communication terminal that the deletion request has been successfully executed.

Regarding the communication terminal provided in the embodiment, a delete request is transmitted to the server by the first communication terminal, making the server judge whether the message under delete has been forwarded to the second communication terminal according to the delete request. If the message under delete is judged forwarded to the second communication terminal, the delete request will be forwarded to the second communication terminal, letting the second communication terminal delete the message under delete according to delete request. If the message under delete is judged not forwarded to the second communication terminal, the operation to forward the message under delete to the second communication terminal will be cancelled and the stored message under delete will be deleted. Thus, the message transmitted to the server and the second communication terminal by the first communication terminal is deleted. Because the process needs no set by user, the operation is simple and fast. Besides, because the process to delete message is available for any message transmitted from the first communication terminal, it enjoys extensive application and good flexibility.

Figure 13:
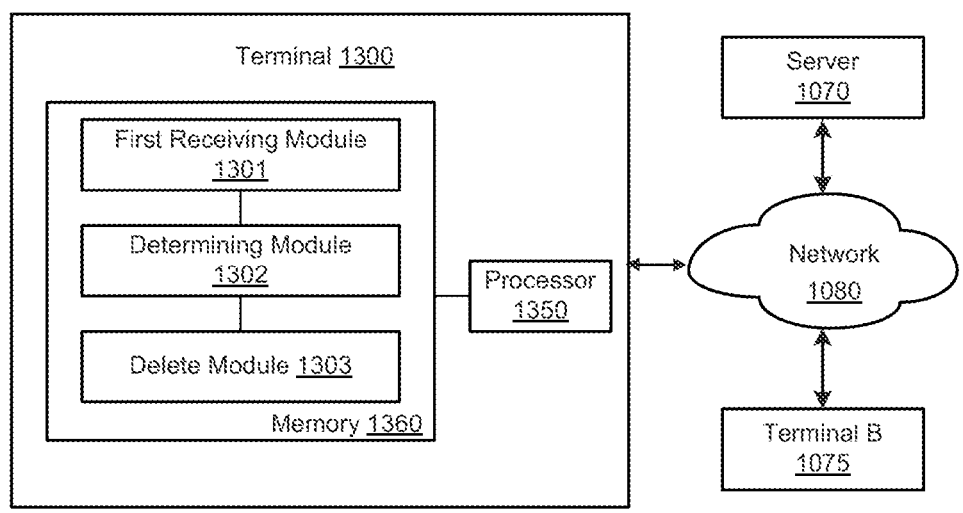
FIG. 13 is an exemplary structure diagram of a communication terminal, according to another embodiment of the disclosure.
Figure 14:
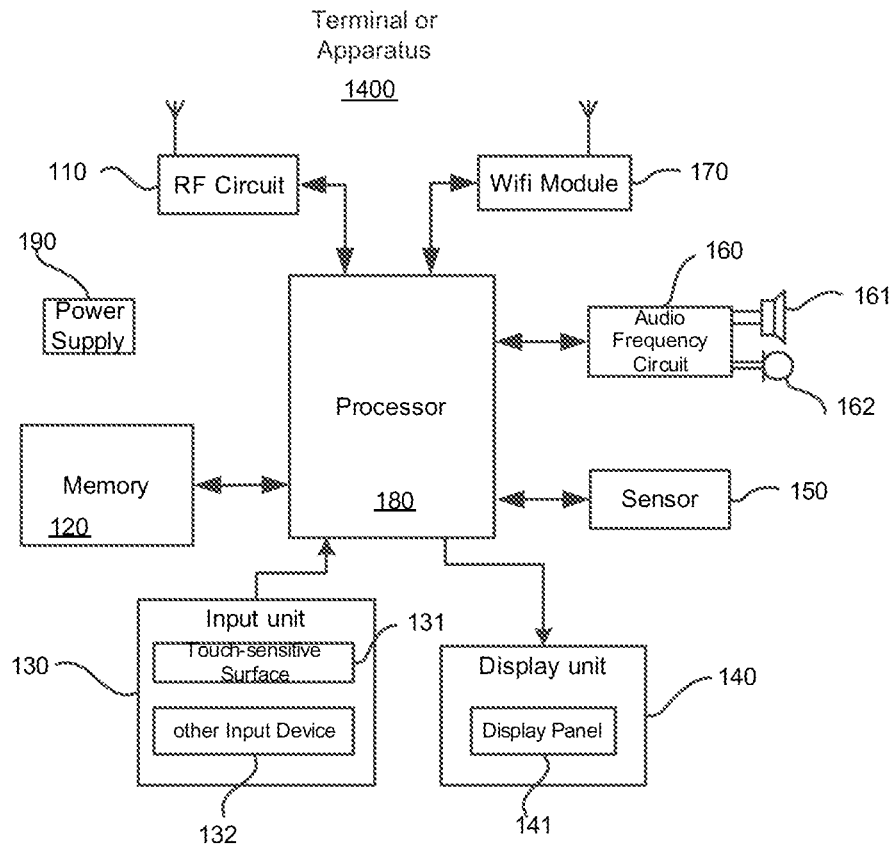
FIG. 14 is an exemplary structure diagram of a communication terminal, according to another embodiment of the disclosure.

FIGS. 12 and 14 represent an exemplary structural diagram of a communication terminal (1200), according to an embodiment of the disclosure. The terminal 1200 may include at least: a RF (Radio Frequency) Circuit (110), a Memory (120) which may include one or more non-transitory computer readable storage medium, an Input unit (130), a Display unit (140), a Sensor (150), an Audio Frequency Circuit (160), a WiFi (wireless fidelity) Module (170), a Processor (180) which may include one or more processing cores and a Power Supply (190) etc. A person skilled in the art recognizes that the terminal (1200) is not limited to its structure shown in FIG. 13, it may include more or less components than the components depicted in the Figure, or their equivalence or in any combinations.

The RF Circuit (110) may receive and transmit RF signals during a call or sending and receiving information. More specifically, the RF Circuit (110) may receive downlink information from a base station and submit information to one or more Processor (180) for processing. Additionally, the RF Circuit (110) may send data related to the uplink to the base station. Generally, the RF Circuit (110) may include an antenna, at least one amplifier, a tuner, one or more oscillators, User Identity Module (SIM) card, transceiver, coupler, LNA (Low Noise Amplifier) and duplexer, etc. In addition, the RF Circuit (110) may also communicate with other equipment (e.g., terminal B (875) or server (870)) via wireless communications and a network (880). The wireless communication may use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The Memory (120) stores software programs and at least the various disclosed modules, The Processor (180) may run software programs stored in the modules in the memory (120), perform various functions from the applications and process data. The memory (120) may include programs storage area and data storage area, wherein the programs storage area may store the operating system and at least one application with media functions (e.g. sound playback function and image playback function, etc.), etc. The data storage area for storing the generated data (e.g. audio data and phone book, etc.) may depend on the use of the Terminal (1200). In addition, the memory (120) may include high-speed random access memories (RAM), non-volatile memory (ROM), e.g. at least one disks storage device, flash memory devices, or other volatile solid state memory devices. Accordingly, memory (120) may also include a memory controller for providing access to memory (120) by the Processor (180) and the Input unit (130).

The Input unit (130) may receive entered numbers or characters information, and generate keyboard, mouse, joystick and optical or trackball signal input related to user settings and functions control. More specifically, the Input unit (130) may include a Touch-sensitive Surface (131) and other Input Device (132). The Touch-sensitive Surface (131) may also be referred to as touch display screen or touch pad, for collecting the touch operations on or near the screen or pad (e.g. the operations on or near the Touch-sensitive Surface (131) by suitable objects or accessories such as user fingers, stylus etc.), and driving corresponding connecting devices based on the preset programs. Optionally, the Touch-sensitive Surface (131) may include two parts, a touch detection device and a touch controller. Wherein the touch detection device for detecting the user's locations and the signal brought by touch operations, and transmitting the signal to the touch controller. The touch controller may receive touch information from the touch detection device and transform the signals into contact coordinates which will be sent to the Processor (180), and receive and execute the commands from the Processor (180).

In addition, resistance-type, capacitance-type, infrared ray and surface acoustic wave may be applied to form the Touch-sensitive Surface (131). The Input unit (131) may also include other Input Device (132) other than the Touch-sensitive Surface (131). Other Input Device (132) may include but not limited to one or more of physical keyboards, function keys (e.g. volume control buttons, switch keys, etc.), trackballs, mouse, joysticks, etc.

The Display unit (140) for displaying the information entered by the user. The information supplied to the user or a variety of graphical user interfaces (GUI) of the Terminal (1200); graphics, texts, icons, videos and any combination of them may constitute as graphical user interfaces. The Display unit 140 may include a Display Panel (141) which may be configured optionally with LCD (Liquid Crystal Display), OLED (Organic Light-Emitting Diode) etc.

Furthermore, the Display Panel (141) may cover Touch-sensitive Surface (131), when the Touch-sensitive Surface (131) detects touch operations on or near itself, it may send signals to the Processor (180) to determine the type of the touch event, then the Processor (180) may provide corresponding visual outputs on the Display Panel (141), depending on the type of the touch event.

The Terminal (1200) may also include a Sensor (150). For example, the sensor (150) may include at least optical sensors, motion sensors and other sensors. Specifically, the optical sensor may include an ambient light sensor and a proximity sensor, wherein, the ambient light sensor can adjust the brightness of the Display Panel (141) according to the ambient light and darkness, a proximity sensor can turn off Display Panel (141) and/or backlight when the Terminal (1000) is moved to the ear. A Gravity acceleration sensor is a motion sensor, which detects a magnitude of acceleration in all directions (generally triaxial), and detect the magnitude and direction of gravity when it is stationary. The sensor (150) may include mobile phone posture applications (e.g. switch the screen anyway, related games and magnetometer posture calibration) and vibration recognition related functions (e.g. pedometers and percussions), etc.; as to the gyroscope, barometer, hygrometer, thermometer, infrared sensors and other sensors which may also supplied on the Terminal 1200 are need not be repeated here.

The voice frequency or Audio Circuit (160) may include a Speaker (161) and a microphone (162) may provide an audio interface between the user and the Terminal (1200). The Audio Circuit (160) may convert the received audio data into an electrical signal to be transmitted to the Speaker (161), Electrical signals may be converted into a sound signal output; On the other hand, the collected sound signal may be converted into electrical signals by Speaker (162), The Audio Circuit (160) may receive the electrical signals and converts them into audio data which may be exported to the Processor (180) for processing and transmitted to another terminal via the RF Circuit (110) or exported to memory (120) for further processing. The Audio Circuit (160) may also include earplug jack to provide communication between the peripheral headset and the Terminal (1200).

WiFi is a technology of short range wireless transmission, the Terminal (1200) can help users to send and receive email, browse the web and access streaming media etc. via the WiFi Module (170), provide users with wireless broadband Internet access.

The Processor (180) may be a control center of the Terminal (1000), for using a variety of interfaces and lines to connect various parts throughout a mobile phone, and executing various functions of the Terminal (1200) and processing data by running or executing software programs and/or modules stored in memory (120) and calling the data stored in memory (120), to achieve the overall control of the mobile phone. Optionally, the Processor (180) may include one or more processing cores; preferably, the Processor (180) may be integrated with an application processor and a modem processor, wherein the application processor is mainly used to process operating system, user interface and applications etc. A modem processor may be used to process wireless communications. It can be understood that the modem processor may not be integrated into Processor 180.

The Terminal (1200) may also include a Power Supply (190) (e.g. a battery) which powers the various components, preferably, the power supply can achieve logic connection with the Processor (180) via the power supply management system, and thus achieving functions such as charging, discharging and power consumption management via the power supply management system. Power Supply (190) may also include one or more power sources such as a DC supply or an AC power supply, recharging system, power supply failure detection circuit, power supply converter or inverter and power supply status indicator etc.

Although not shown in FIGS. 12 and 14, the Terminal (1200 or 1400) may also include a camera, a Bluetooth module etc., which need not be described here. In specific embodiment, the display module of terminal is touch-screen display. Besides, the terminal (1200) may include a non-transitory memory (120) which stores one or more machine readable programs, to be executed by one or more processors (180). The one or more programs may include instructions which cause a communication to execute following operations of: receiving from a first communication terminal, a delete request to delete a sent instant message which has been transmitted from the first communication terminal to a second communication terminal, wherein the delete request comprises an identification which identifies the sent instant message which is to be deleted; determining whether the sent instant message which is to be deleted has already been successfully forwarded to the second communication terminal; and if it is determined that the sent instant message which is to be deleted has already been successfully forwarded to the second communication terminal, forwarding the delete request to the second communication terminal to facilitate deletion of the sent instant message by the second communication terminal.

The embodiment provides a kind of GUI, which is used in terminal. The terminal comprises touch-screen display, memorizer and one or more processors used to execute one or more programs; the GUI may include functions: obtaining a delete request to delete a sent instant message which has been transmitted to a second communication terminal, wherein the delete request comprises an identification which identifies the sent instant message which is to be deleted; and sending to a server the delete request, such that the server forwards the delete request to the second communication terminal in order to facilitate deletion of the sent instant message according to the delete request.

Above all, The GUI provided in the embodiment transmits a delete request to server (103), making the server (103) judge whether the message under delete has been forwarded to the second communication terminal (102) according to the delete request. If the message under delete is judged forwarded successfully to the second communication terminal, the delete request will be forwarded to the second communication terminal, letting the second communication terminal delete the message under delete according to delete request. If the message under delete is judged not forwarded to the second communication terminal, the operation to forward the message under delete to the second communication terminal will be cancelled and the stored message under delete will be deleted. Thus, the message transmitted to the server and the second communication terminal by the first communication terminal is deleted. Because the process needs no set by user, the operation is simple and fast. Besides, because the process to delete message is available for any message transmitted from the first communication terminal, it enjoys extensive application and good flexibility.

FIG. 13 is an exemplary structure diagram of a communication terminal, according to another embodiment of the disclosure. The embodiment of the invention provides a communication terminal, which is used to execute the functions of the second communication terminal in the above described embodiments. Referring to FIG. 13, the communication terminal (1300) may include at least a processor (1350) operating in conjunction with at least a memory (1360) which stores instruction codes operable as plurality of modules, wherein the plurality of modules may include: a first receiving module (1301), used to receive the delete request, transmitted by the first communication terminal (101) and carrying identification of the message under delete, wherein the message under delete is the one transmitted from the first communication terminal (101) to the second communication terminal (102); a determining module (1302), to determine whether the message under delete is forwarded successfully to the second communication terminal (102); and a deletion module (1303), to delete the stored instant message to be deleted, if the instant message to be deleted has been stored.

Preferably, the communication terminal (1300) also includes: a second receiving module, to receive a response notification message transmitted by the server (103); and a display module, to display the notification message, forwarded by the server (103), that the second communication terminal (102) does not support delete request operation Preferably, the communication terminal also includes: a return module, to send a notification message about the nonsupport of delete request operation back to the server (102) if the operation to delete message under delete is not supported, making the server (103) forward the notification message about the nonsupport of delete operation to the first communication terminal (101).

The communication terminal (1300) provided in the embodiment can receive a delete request forwarded by server (103) and delete the stored message under delete according to the delete request. It realizes the deletion of message from the first communication terminal to the second communication terminal. Because the process needs no set by user, the operation is simple and fast. Besides, because the process to delete message is available for any message transmitted from the first communication terminal, it enjoys extensive application and good flexibility.

Figure 15:
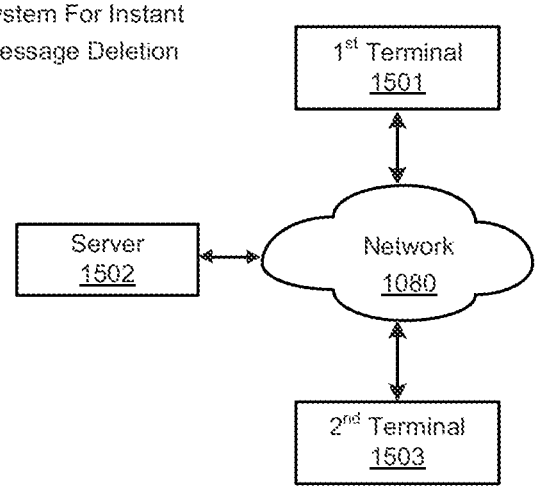
FIG. 15 is an exemplary structure diagram of a communication terminal, according to another embodiment of the disclosure.

FIG. 15 is an exemplary structure diagram of a communication terminal, according to another embodiment of the disclosure. Referring to FIG. 15, the embodiment of the invention provides a system for message delete, which comprises first communication terminal (1501), server (1502) and second communication terminal (1503), wherein the server (1502) is descried in detail and not further described herein; the first communication terminal (1501) is descried in detail and not further described herein; and the second communication terminal (1503) is descried in detail and not further described herein.

It is important to note that the server, the first communication terminal and the second communication terminal provided in embodiments above, are illustrated respectively according to their own function modules. In practical application, the functions above can be allocated to be executed by different function modules as required, namely to divide the inner structure of device into different function modules in order to perform all or part of the functions above. In addition, the embodiments of the system and process to delete message of the first communication terminal and the second communication terminal provided in embodiments above, belong to a same conception, detailed implementation process of which is described in process embodiment and is not described in detail here.

The order of embodiments of the invention is made just for illustration, but does not show their advantage or disadvantage.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands are used to enable a computer, server, a smart phone, a tablet or any similar computing device to render service login provided by a service provider.

The foregoing represents only some preferred embodiments of the present disclosure and their disclosure cannot be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A system for facilitating deletion of a sent instant message in messaging communication, wherein the system comprises a server, a first communication terminal and a second communication terminal, wherein the sent instant message is transmitted from the first communication terminal to the second terminal via the server,
   wherein the server performs the functions of:
      receiving from the first communication terminal, a delete request to delete the sent instant message which has been transmitted from the first communication terminal for forwarding to the second communication terminal, wherein the delete request comprises an identification which identifies the sent instant message which is to be deleted;
      determining whether the sent instant message which is to be deleted has already been successfully forwarded to the second communication terminal; and
         if it is determined that the sent instant message which is to be deleted has already been successfully forwarded to the second communication terminal, forwarding the delete request to the second communication terminal to facilitate deletion of the sent instant message by the second communication terminal and transmits a first notification message to the second communication terminal for display, that the sent instant message has been successfully deleted;
         if it is determined that the sent instant message which is to be deleted has still not been successfully forwarded to the second communication terminal, cancelling further operation on forwarding the sent instant message which is to be deleted to the second communication terminal, wherein:
      after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein
      after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;
      after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;
   wherein the second communication terminal is configured to:
      determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;
      in case if the second communication terminal does not support facilitating the deletion of the sent instant message; the second communication terminal sends a second notification message to the server such that the second notification message is forwarded by the server to the first communication terminal that the sent instant message is not deleted.

2. A method of deleting a sent instant message in messaging communication, comprising:
   receiving by a server from a first communication terminal, a delete request to delete a sent instant message which has been transmitted from the first communication terminal for forwarding to a second communication terminal, wherein the delete request comprises an identification which identifies the sent instant message which is to be deleted;
   determining by the server, whether the sent instant message which is to be deleted has already been successfully forwarded to the second communication terminal:
      if it is determined that the sent instant message which is to be deleted has already been successfully forwarded to the second communication terminal, forwarding the delete request to the second communication terminal to facilitate deletion of the sent instant message by the second communication terminal and transmits a first notification message to the second communication terminal for display, that the sent instant message has been successfully deleted;
      if it is determined that the sent instant message which is to be deleted has still not been successfully forwarded to the second communication terminal, cancelling further operation on forwarding the sent instant message which is to be deleted to the second communication terminal, wherein:
   after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein
   after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal; wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

3. The method according to claim 2, wherein after receiving the delete request from the first communication terminal, the method further comprises:

receiving a second notification message sent from the second communication terminal to inform that the second communication terminal does not support facilitating the deletion of the sent instant message; and forwarding the second notification message to the first communication terminal.

4. The method according to claim 2, wherein after the deletion of the identified stored sent instant message which is to be deleted, the method further comprises:

returning a response to inform the first communication terminal that the deletion request has been successfully executed.

5. A method of deleting a sent message in messaging communication, comprising a first terminal, performing:

sending to a server, a delete request to delete a sent instant message which has been transmitted from the first terminal for forwarding by the server to a second communication terminal, wherein the delete request carries an identification which identifies the sent instant message which is to be deleted by the second communication terminal, and the server determines whether the sent instant message which is to be deleted has already been successfully forwarded to the second communication terminal:

if it is determined by the server that the sent instant message which is to be deleted has already been successfully forwarded to the second communication terminal, forwarding by the server, the delete request to the second communication terminal to facilitate deletion of the sent instant message by the second communication terminal and the server transmitting a first notification message to the second communication terminal for display, that the sent instant message has been successfully deleted;

if it is determined by the server that the sent instant message which is to be deleted has still not been successfully forwarded to the second communication terminal, cancelling by the server, further operation on forwarding the sent instant message to the second communication terminal, wherein:

after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;

wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

6. The method according to claim 5, wherein the obtaining of the delete request comprises:

detecting by the server, a selection operation on the sent instant message which is to be deleted and determining whether a time of transmission for the sent instant message which is to be deleted has exceeded a preset duration;

if the time of transmission for the sent instant message which is to be deleted has not exceeded the preset duration, displaying on the first terminal, a deletion option selection for carrying out deletion of the sent instant message, and upon detecting the selection of the deletion option, obtaining the delete request which carries the identification which identifies the sent instant message which is to be deleted.

7. The method according to claim 5, wherein after sending to the server the delete request, the method further comprises:

receiving and displaying by the first terminal, a first notification message forwarded by the server, wherein the first notification message informs that the second communication terminal does not support facilitating the deletion of the sent instant message.

8. The method according to claim 5, wherein after sending to the server the delete request, the method further comprises:

receiving a response returned by the server, informing the first communication terminal that the deletion request has been successfully executed.

9. A method of deleting a sent message in messaging communication, comprising a second communication terminal, performing:

receiving a delete request forwarded by a server, wherein the delete request is sent from a first communication terminal to the server to be forwarded to the second terminal, wherein the delete request is for deleting a sent instant message which has been priorly transmitted by the first communication terminal to the server for forwarding by the server to the second communication terminal, wherein the delete request comprises an identification which identifies the sent instant message which is to be deleted by the second communication terminal;

wherein the server determines whether the sent instant message which is to be deleted has already been successfully forwarded to the second communication terminal; and if it is determined by the server that the sent instant message which is to be deleted has already been successfully forwarded to the second communication terminal, forwarding by the server, the delete request to the second communication terminal to facilitate deletion of the sent instant message by the second communication terminal and the server transmitting a first notification message to the second communication terminal for display, that the sent instant message has been successfully deleted;

if it is determined by the server that the sent instant message which is to be deleted has still not been successfully forwarded to the second communication terminal, cancelling by the server, further operation on forwarding the sent instant message to the second communication terminal, wherein:

after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;

wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

10. A server for facilitating deletion of a sent instant message in messaging communication, the server comprises at least a processor operating in conjunction with at least a memory which stores instruction codes which configure the server to:

receive from a first communication terminal, a delete request to delete a sent instant message which has been transmitted from the first communication terminal for forwarding to a second communication terminal, wherein the delete request comprises an identification which identifies the sent instant message which is to be deleted;

determine whether the sent instant message which is to be deleted has already been successfully forwarded to the second communication terminal; and if it is determined that the sent instant message which is to be deleted has already been successfully forwarded to the second communication terminal, forwarding the delete request to the second communication terminal to facilitate deletion of the sent instant message by the second communication terminal and transmits a first notification message to the second communication terminal for display, that the sent instant message has been successfully deleted;

if it is determined that the sent instant message which is to be deleted has still not been successfully forwarded to the second communication terminal, cancelling further operation on forwarding the sent instant message which is to be deleted to the second communication terminal, wherein:

after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;

wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

11. The server according to claim 10, wherein the server is further configured to:

receive a second notification message sent from the second communication terminal to inform that the second communication terminal does not support facilitating the deletion of the sent instant message; and forward the second notification message to the first communication terminal.

12. The server according to claim 10, wherein the server is further configured to:

return a response to inform the first communication terminal that the deletion request has been successfully executed.

13. A first communication terminal in messaging communication, which facilitates deletion of an instant message sent to another communication terminal, the communication terminal comprises at least a processor operating in conjunction with at least a memory which stores instruction codes to configure the first communication terminal to:

obtain a delete request to delete a sent instant message which has been transmitted to a second communication terminal, wherein the delete request comprises an identification which identifies the sent instant message which is to be deleted;

determining by the server whether the sent instant message which is to be deleted has already been successfully forwarded to the second communication terminal; and if it is determined by the server that the sent instant message which is to be deleted has already been successfully forwarded to the second communication terminal, forwarding by the server, the delete request to the second communication terminal to facilitate deletion of the sent instant message by the second communication terminal and the server transmitting a first notification message to the second communication terminal for display, that the sent instant message has been successfully deleted;

if it is determined by the server that the sent instant message which is to be deleted has still not been successfully forwarded to the second communication terminal, cancelling by the server, further operation on forwarding the sent instant message to the second communication terminal, wherein:

after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;

wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

14. The first communication terminal according to claim 13, wherein the communication terminal is further configured to:
   detect a selection operation on the sent instant message which is to be deleted and determining whether a time of transmission for the sent instant message which is to be deleted has exceeded a preset duration;
   determine whether a time of transmission for the sent instant message which is to be deleted has exceeded a preset duration;
   if the time of transmission for the sent instant message which is to be deleted has not exceeded the preset duration, display a deletion option selection for carrying out deletion of the sent instant message; and
   upon detecting the selection of the deletion option, obtain the delete request which carries the identification which identifies the sent instant message which is to be deleted.

15. The communication terminal according to claim 13, wherein the communication terminal is further configured to:
   receive a first notification message forwarded by the server, wherein the first notification message informs that the second communication terminal does not support facilitating the deletion of the sent instant message; and
   display the first notification message forwarded by the server on the first communication terminal.

16. The communication terminal according to claim 13, wherein the communication terminal is further configured to:
   receive a response returned by the server, informing the first communication terminal that the delete request has been successfully executed.

17. A communication terminal in messaging communication, which facilitates deletion of a sent instant message in messaging communication sent by another communication terminal, the communication terminal comprises at least a processor operating in conjunction with at least a memory which stores instruction codes operable configure the communication terminal to:
   receive a delete request forwarded by a server, wherein the delete request is sent from the another communication terminal to the server to be forwarded to the communication terminal, and the delete request is for deleting a sent instant message which has been transmitted by the another communication terminal to the communication terminal, wherein the delete request comprises an identification which identifies the sent instant message which is to be deleted by the communication terminal;
   determine by the server, whether the sent instant message which is to be deleted has already been successfully forwarded to the communication terminal; and
   if it is determined by the server, that the sent instant message which is to be deleted has already been successfully forwarded to the communication terminal, forwarding the delete request to the communication terminal to facilitate deletion of the sent instant message by the communication terminal and transmits a first notification message to the communication terminal for display, that the sent instant message has been successfully deleted;
   if it is determined by the server, that the sent instant message which is to be deleted has still not been successfully forwarded to the communication terminal, cancelling further operation on forwarding the sent instant message which is to be deleted to the communication terminal, wherein:
   after the cancelling of the transmission of the sent instant message to the communication terminal, the server transmits the first notification message to the communication terminal for display that the sent instant message has been successfully deleted, such that the display of the first notification message replaces the display of the deleted sent instant message, wherein
   after receiving the delete request from the another communication terminal, the server determining whether the sent instant message which is to be deleted has been locally stored in the communication terminal according to the identification which identifies the sent instant message; and if so, facilitate deleting of the identified locally stored sent instant message in the communication terminal;
   after facilitating the deletion of the identified locally stored sent instant message in the communication terminal, returning a response to inform the another communication terminal that the deletion request has been successfully executed; and transmits the first notification message to the communication terminal for display, that the locally stored sent instant message has been successfully deleted from the communication terminal;
   wherein the communication terminal is configured to:
   determine according to the identification which identifies the sent instant message, whether the sent instant message which is to be deleted is still locally stored by the communication terminal; and if so, deleting by the communication terminal, the identified locally stored sent instant message according to the delete request and receive the first notification message from the server and display on the communication terminal, that the locally stored sent instant message has been successfully deleted from the communication terminal;
   in case if the communication terminal does not support facilitating the deletion of the sent instant message; the communication terminal sends a second notification message to the server such that the second notification message is forwarded by the server to the another communication terminal that the sent instant message is not deleted.

18. The communication terminal according to claim 17, wherein the server performs the deletion of the sent instant message which is to be deleted, the communication terminal is configured to:
   receive a first notification message from the server informing of a successful deletion of the sent instant message by the server, and
   display the first notification message on the communication terminal, such that the display of the first notification message replaces the display of the deleted sent instant message from the another communication terminal.

19. A non-transitory computer-readable-medium having stored thereon at least one executable code section, wherein the at least one code section when executed by a hardware processor on a server, causes to server to perform operations for deleting of a sent instant message in messaging communication, the operations comprising:
   receiving by the server from a first communication terminal, a delete request to delete a sent instant message which has been transmitted from the first communication terminal for forwarding to a second communication terminal, wherein the delete request comprises an identification which identifies the sent instant message which is to be deleted;

determining by the server, whether the sent instant message which is to be deleted has already been successfully forwarded to the second communication terminal:

if it is determined that the sent instant message which is to be deleted has already been successfully forwarded to the second communication terminal, forwarding the delete request to the second communication terminal to facilitate deletion of the sent instant message by the second communication terminal and transmits a first notification message to the second communication terminal for display, that the sent instant message has been successfully deleted;

if it is determined that the sent instant message which is to be deleted has still not been successfully forwarded to the second communication terminal, cancelling further operation on forwarding the sent instant message which is to be deleted to the second communication terminal, wherein:

after the cancelling of the transmission of the sent instant message to the second communication terminal, the server transmits the first notification message to the second communication terminal for display that the sent instant message has been successfully deleted, such that the display of the first notification message replaces the display of the deleted sent instant message, wherein after receiving the delete request from the first communication terminal, the server determining whether the sent instant message which is to be deleted has been locally stored in the second communication terminal according to the identification which identifies the sent instant message; and if so, facilitate deleting of the identified locally stored sent instant message in the second communication terminal;

after facilitating the deletion of the identified locally stored sent instant message in the second communication terminal, returning a response to inform the first communication terminal that the deletion request has been successfully executed; and transmits the first notification message to the second communication terminal for display, that the locally stored sent instant message has been successfully deleted from the second communication terminal;

wherein the second communication terminal is configured to:

determine according to the identification which identifies the sent instant message, whether the sent instant message which is to be deleted is still locally stored by the second communication terminal; and if so, deleting by the second communication terminal, the identified locally stored sent instant message according to the delete request and receive the first notification message from the server and display on the second communication terminal, that the locally stored sent instant message has been successfully deleted from the second communication terminal;

in case if the second communication terminal does not support facilitating the deletion of the sent instant message; the second communication terminal sends a second notification message to the server such that the second notification message is forwarded by the server to the first communication terminal that the sent instant message is not deleted.

* * * * *